United States Patent
Nakayama (10) Patent No.: US 10,012,144 B2
(45) Date of Patent: Jul. 3, 2018

(54) V-TYPE ENGINE

(71) Applicant: YAMAHA HATSUDOKI KABUSHIKI KAISHA, Iwata-shi, Shizuoka (JP)

(72) Inventor: Koichi Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 245 days.

(21) Appl. No.: 15/063,612

(22) Filed: Mar. 8, 2016

(65) Prior Publication Data

US 2016/0273447 A1    Sep. 22, 2016

(30) Foreign Application Priority Data

Mar. 17, 2015 (JP) .................................. 2015-053696

(51) Int. Cl.
| | |
|---|---|
| F02B 75/22 | (2006.01) |
| F01N 13/10 | (2010.01) |
| F01N 13/18 | (2010.01) |
| F01N 3/10 | (2006.01) |
| F02B 61/04 | (2006.01) |
| F01N 13/08 | (2010.01) |

(52) U.S. Cl.
CPC .............. *F02B 75/22* (2013.01); *F01N 3/101* (2013.01); *F01N 13/085* (2013.01); *F01N 13/107* (2013.01); *F01N 13/1827* (2013.01); *F02B 61/045* (2013.01); *F01N 2590/021* (2013.01); *Y02T 10/22* (2013.01)

(58) Field of Classification Search
CPC .... F02B 75/22; F01N 13/107; F01N 13/1827; F01N 3/101
See application file for complete search history.

(56) References Cited

U.S. PATENT DOCUMENTS

| | | | | |
|---|---|---|---|---|
| 3,132,870 A | * | 5/1964 | Pschera ................ | F16J 15/0887 277/610 |
| 4,477,094 A | * | 10/1984 | Yamamoto .............. | B32B 19/04 277/592 |

(Continued)

FOREIGN PATENT DOCUMENTS

| | | |
|---|---|---|
| EP | 1 429 059 A1 | 6/2004 |
| EP | 2 594 760 A2 | 5/2013 |

(Continued)

OTHER PUBLICATIONS

Nakayama, K., et al. "Outboard Motor"; U.S. Appl. No. 15/057,338 filed Mar. 1, 2016.

(Continued)

*Primary Examiner* — Patrick Maines
(74) *Attorney, Agent, or Firm* — Keating and Bennett, LLP (57) ABSTRACT

An engine includes a V-shaped cylinder body, first and second exhaust manifolds inside a V-shaped line, and an exhaust pipe. The exhaust pipe includes a first upstream end portion into which exhaust gases discharged from first cylinders to the first exhaust manifold flow, and a second upstream end portion into which exhaust gases discharged from second cylinders to the second exhaust manifold flow. A spiral wound gasket seals a gap between the first exhaust manifold and the first upstream end portion.

13 Claims, 8 Drawing Sheets

(56) References Cited

U.S. PATENT DOCUMENTS

| | | | | |
|---|---|---|---|---|
| 4,519,619 | A * | 5/1985 | Doyle | F16J 15/123 277/594 |
| 5,308,090 | A * | 5/1994 | Hamada | F16J 15/125 277/609 |
| 5,454,604 | A * | 10/1995 | Yahagi | F01N 13/1827 277/627 |
| 5,518,280 | A * | 5/1996 | Mann | F16L 23/16 285/363 |
| 5,997,007 | A * | 12/1999 | Hanashima | F16J 15/125 277/610 |
| 6,055,806 | A * | 5/2000 | Dalton | F01N 13/10 123/193.5 |
| 2010/0041287 | A1 * | 2/2010 | Woods | B63H 21/32 440/89 R |
| 2013/0062878 | A1 * | 3/2013 | Nakayama | F01N 13/00 285/124.1 |
| 2013/0130576 | A1 | 5/2013 | Ochiai et al. | |
| 2013/0130577 | A1 * | 5/2013 | Ochiai | F01N 3/28 440/89 R |
| 2014/0242858 | A1 | 8/2014 | Ochiai et al. | |
| 2014/0322997 | A1 | 10/2014 | Ochiai et al. | |
| 2015/0369110 | A1 * | 12/2015 | McHenry | F02B 37/00 60/605.1 |

FOREIGN PATENT DOCUMENTS

| | | |
|---|---|---|
| JP | 2011-021653 A | 2/2011 |
| JP | 2012-017790 A | 1/2012 |
| JP | 2013-057297 A | 3/2013 |

OTHER PUBLICATIONS

Official Communication issued in corresponding European Patent Application No. 16157994.1, dated Jul. 1, 2016.

\* cited by examiner

V-TYPE ENGINE

BACKGROUND OF THE INVENTION

1. Field of the Invention

The present invention relates to a V-type engine.

2. Description of the Related Art

US 2014/0322997 A1 discloses an outboard motor powered by a V-type engine. This outboard motor is equipped with an in-bank exhaust system that discharges exhaust gases to the inside of two cylinder banks. In the V-type engine, a floating structure is used to absorb dimensional errors of the respective components.

In detail, an exhaust pipe includes two upstream end portions connected to two exhaust manifolds, respectively. One upstream end portion is connected to one exhaust manifold via two O-rings, and is movable with respect to the one exhaust manifold. The other upstream end portion is fixed to the other exhaust manifold, and is not movable with respect to the other exhaust manifold.

One upstream end portion of the exhaust pipe is inserted into an insertion hole provided in the one exhaust manifold. The space between an outer peripheral surface of the upstream end portion and an inner peripheral surface of the insertion hole is sealed by two O-rings. The O-rings are held in annular grooves provided in the insertion hole. One upstream end portion of the exhaust pipe is movable with respect to the one exhaust manifold in a state where the space between the upstream end portion and the insertion hole is sealed by the two O-rings. The position of the exhaust pipe with respect to the one exhaust manifold changes according to a cumulative value of dimensional errors.

In the V-type engine described in US 2014/0322997 A1, by using a floating structure, both a desired sealing performance and absorption of dimensional errors are achieved. However, since O-rings are used to seal the connecting portion between the exhaust pipe and the exhaust manifold, the exhaust manifold is required to include the insertion hole into which the upstream end portion of the exhaust pipe is inserted. Further, two annular grooves that hold the two O-rings must be provided on the inner peripheral surface of the insertion hole. Therefore, the structure of the connecting portion becomes complicated.

SUMMARY OF THE INVENTION

In order to overcome the previously unrecognized and unsolved challenges described above, a preferred embodiment of the present invention provides a V-type engine including a V-shaped cylinder body disposed along a V-shaped line defined by a first plane passing through centerlines of a plurality of first cylinders and a second plane passing through centerlines of a plurality of second cylinders, a first exhaust manifold connected to the plurality of first cylinders and disposed inside of the V-shaped line, a second exhaust manifold connected to the plurality of second cylinders and disposed inside of the V-shaped line, an exhaust pipe including a first upstream end portion into which exhaust gases discharged from the plurality of first cylinders to the first exhaust manifold flow, and a second upstream end portion into which exhaust gases discharged from the plurality of second cylinders to the second exhaust manifold flow, and a spiral wound gasket that seals a gap between the first exhaust manifold and the first upstream end portion.

With this arrangement, exhaust gases generated in the first cylinders and the second cylinders are collected in the exhaust pipe via the first exhaust manifold and the second exhaust manifold disposed inside of the V-shaped line. The elastically deformable spiral wound gasket is disposed between the first exhaust manifold and the first upstream end portion of the exhaust pipe. The gap between the first exhaust manifold and the first upstream end portion is sealed by the spiral wound gasket. Further, dimensional errors of the first exhaust manifold, etc., are absorbed by the elasticity of the spiral wound gasket. Therefore, both an excellent sealing performance and absorption of dimensional errors are achieved. Further, unlike the case where O-rings are used, the insertion hole and annular grooves are not necessary, so that the structure is prevented from becoming complicated.

The V-type engine may further include a fixing member that maintains a constant distance between the second exhaust manifold and the second upstream end portion by fixing the second upstream end portion to the second exhaust manifold.

With this arrangement, the second upstream end portion of the exhaust pipe is fixed to the second exhaust manifold by the fixing member. The distance between the second exhaust manifold and the second upstream end portion is maintained constant, so that dimensional errors are hardly absorbed by the connecting portion between the second exhaust manifold and the second upstream end portion. That is, when dimensional errors occur, the distance between the first exhaust manifold and the first upstream end portion changes. However, the elastically deformable gasket is disposed between the first exhaust manifold and the exhaust pipe, so that the dimensional errors are absorbed while also achieving the desired sealing performance. Therefore, a simplified connecting structure in the connecting portion between the second exhaust manifold and the second upstream end portion achieves both the desired sealing performance and absorption of any dimensional errors.

The first upstream end portion may be separated from the first exhaust manifold along the entire region of the first upstream end portion.

With this arrangement, the first upstream end portion is separated from the first exhaust manifold along the entire region of the first upstream end portion of the exhaust pipe. Therefore, elastic deformation of the spiral wound gasket is not prevented by contact between the first upstream end portion and the first exhaust manifold. Accordingly, dimensional errors are reliably absorbed by the spiral wound gasket.

The V-type engine may further include an inner cylinder portion provided in one of the first exhaust manifold and the first upstream end portion. The spiral wound gasket may surround the inner cylinder portion.

With this arrangement, the spiral wound gasket surrounds the inner cylinder portion provided in one of the first exhaust manifold and the first upstream end portion. The spiral wound gasket is prevented from moving in the radial directions of the spiral wound gasket by the inner cylinder portion. Accordingly, an amount of eccentricity of the spiral wound gasket with respect to the inner cylinder portion is significantly reduced or prevented, and the spiral wound gasket is accurately centered.

The inner cylinder portion surrounded by the spiral wound gasket may include a solid portion that seals an area extending from an inner peripheral surface of the inner cylinder portion to an outer peripheral surface of the inner cylinder portion across the entire circumference of the inner cylinder portion.

An O-ring is normally lower in heat resistance than the spiral wound gasket. Therefore, when an O-ring is disposed around the inner cylinder portion, a passage inside which cooling water flows is provided inside of the inner cylinder portion to cool the O-ring. That is, the inner cylinder portion must be hollow. On the other hand, in the case where the spiral wound gasket is used, such a passage is not necessary. That is, the inner cylinder portion may be solid. Therefore, as compared with the case where an O-ring is used, the structure of the inner cylinder portion is simplified.

The V-type engine may further include a spring and a bolt that fastens the first exhaust manifold and the first upstream end portion via the spring.

With this arrangement, not only the spiral wound gasket but also one or more springs are provided at the connecting portion between the first exhaust manifold and the first upstream end portion. When the first exhaust manifold, etc., expands or contracts according to a temperature change, dimensional changes of the first exhaust manifold, etc., are absorbed by the elasticity of the one or more springs and the spiral wound gasket. Therefore, even if the dimensions of the first exhaust manifold, etc., change according to a temperature change, excellent sealing performance is achieved.

The V-type engine may further include a cooling water pipe that guides cooling water between a water passage provided in the first exhaust manifold and a water passage provided in the exhaust pipe. In this case, the cooling water pipe may be disposed around the spiral wound gasket.

The V-type engine may further include an O-ring that seals a gap between an outer peripheral surface of the cooling water pipe and one of the first exhaust manifold and the exhaust pipe. Alternatively, the V-type engine may further include an O-ring that seals a gap between an end surface of the cooling water pipe in an axial direction of the cooling water pipe and one of the first exhaust manifold and the exhaust pipe.

The exhaust pipe may further include a collecting portion into which exhaust gases that have flowed in the first upstream end portion and exhaust gases that have flowed in the second upstream end portion flow. In this case, the V-type engine may further include a catalyst disposed in the collecting portion of the exhaust pipe.

With this arrangement, exhaust gases that have flowed from the first upstream end portion into the exhaust pipe and exhaust gases that have flowed from the second upstream end portion into the exhaust pipe gather in the collecting portion of the exhaust pipe. These exhaust gases are purified by the catalyst disposed in the collecting portion. Thus, exhaust gases generated in both of the first cylinders and the second cylinders are collected at one point, so that all exhaust gases are purified by one catalyst. Therefore, the number of components is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
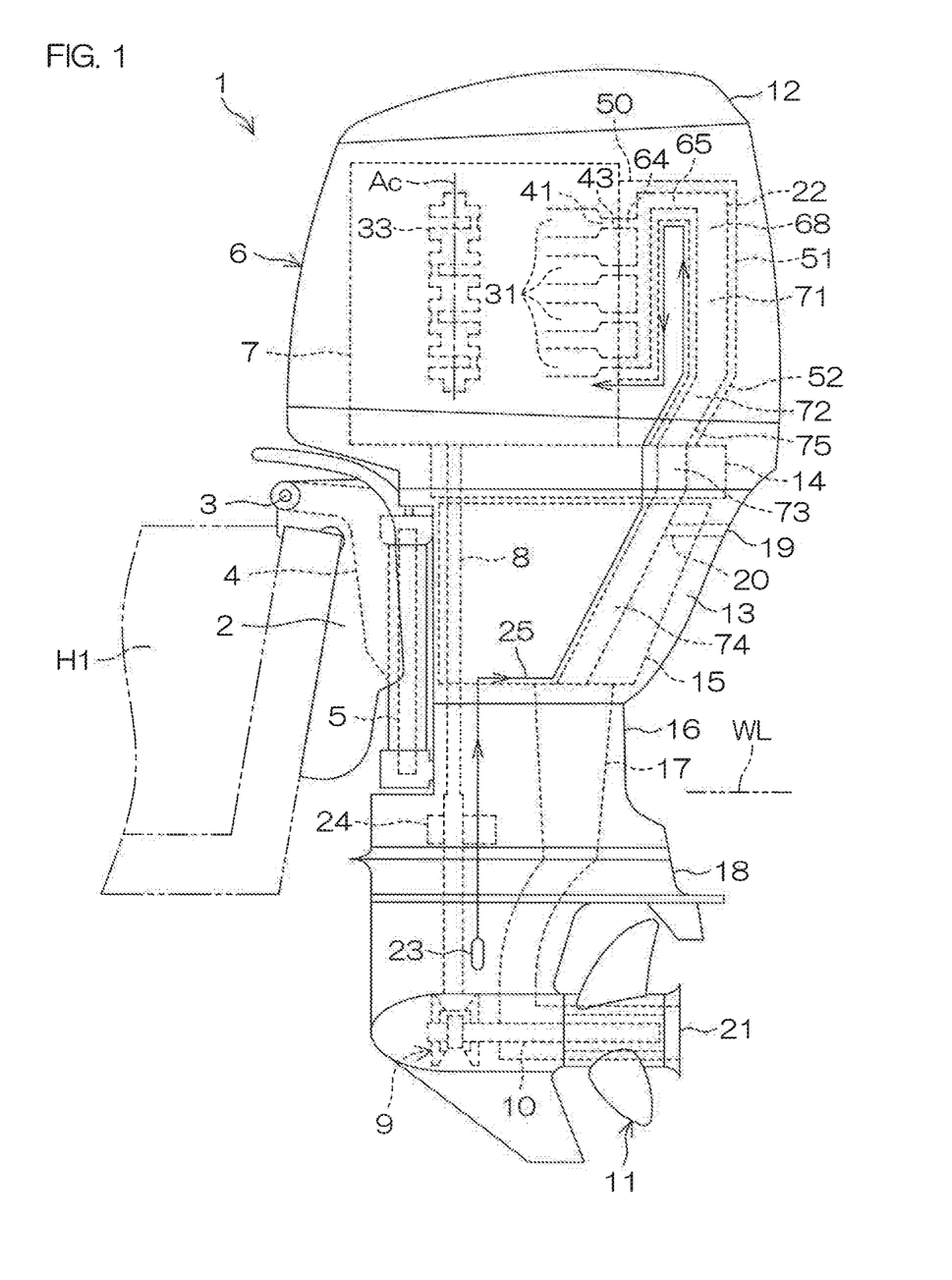
FIG. 1 is a schematic view showing a left side surface of an outboard motor according to a preferred embodiment of the present invention.

FIG. 1 is a schematic view showing a left side surface of an outboard motor 6 according to a preferred embodiment of the present invention.

A vessel propulsion apparatus 1 includes a clamp bracket 2 attachable to the rear portion (stern) of a hull H1, and an outboard motor 6 supported by the clamp bracket 2 via a tilting shaft 3, a swivel bracket 4, and a steering shaft 5. The outboard motor 6 is turnable with respect to the clamp bracket 2 around the centerline of the steering shaft 5 extending in the up-down direction, and turnable with respect to the clamp bracket 2 around the centerline of the tilting shaft 3 extending in the right-left direction.

The outboard motor 6 includes an engine 7 that is an example of an internal combustion that generates power to rotate a propeller 11, and a power transmission system that transmits the power of the engine 7 to the propeller 11. The power transmission system includes a drive shaft 8, a forward-reverse switching mechanism 9, and a propeller shaft 10. Rotation of the engine 7 is transmitted to the propeller shaft 10 via the drive shaft 8 and the forward-reverse switching mechanism 9. The direction of rotation to be transmitted from the drive shaft 8 to the propeller shaft 10 is switched by the forward-reverse switching mechanism 9. The propeller 11 rotates around the centerline of the propeller shaft 10 together with the propeller shaft 10.

The outboard motor 6 includes an engine cowling 12 covering the engine 7, and a casing 13 housing the power transmission system. The casing 13 includes an exhaust guide 14 disposed below the engine 7, an upper case 16 disposed below the exhaust guide 14, and a lower case 18 disposed below the upper case 16. The casing 13 further includes an oil pan 15 that stores lubrication oil to be supplied to movable portions such as the engine 7, and a tubular muffler 17 disposed inside of the upper case 16. The exhaust guide 14, serving as an engine support member, supports the engine 7 in a posture in which the rotation axis Ac of the crankshaft 33 extends in the up-down direction.

The outboard motor 6 includes an exhaust passage 22 that guides exhaust gases of the engine 7 to an exhaust opening 21 disposed below a waterline WL (a height of a water surface when a vessel equipped with the vessel propulsion apparatus 1 stops). The exhaust passage 22 extends from the engine 7 to the propeller 11. The exhaust passage 22 passes through the insides of the exhaust guide 14, the oil pan 15, the muffler 17, and the lower case 18, and opens at a rear end portion of the propeller 11. The rear end portion of the propeller 11 defines the exhaust opening 21 that opens in water.

The outboard motor 6 further includes an idle exhaust passage 20 that guides exhaust gases of the engine 7 to an idle exhaust opening 19 disposed above the waterline WL. An upstream end of the idle exhaust passage 20 is connected to the exhaust passage 22 at a position lower than the engine 7. The idle exhaust passage 20 extends rearward from the exhaust passage 22 to the idle exhaust opening 19. The idle exhaust opening 19 opens at an outer surface of the outboard motor 6. An opening area of the idle exhaust opening 19 is smaller than that of the exhaust opening 21.

Exhaust gases generated in the engine 7 are guided toward the exhaust opening 21 by the exhaust passage 22. When the output of the engine 7 is high, exhaust gases inside of the exhaust passage 22 are mainly discharged into water from the exhaust opening 21. Further, a portion of the exhaust gases inside of the exhaust passage 22 is guided to the idle exhaust opening 19 by the idle exhaust passage 20, and released to the atmosphere from the idle exhaust opening 19. On the other hand, when the output of the engine 7 is low (for example, during idling), the exhaust gas pressure inside of the exhaust passage 22 is low, so that the exhaust gases inside of the exhaust passage 22 are mainly released to the atmosphere through the idle exhaust opening 19.

The outboard motor 6 includes a water inlet 23 that opens at an outer surface of the outboard motor 6, a water pump 24 that takes water as cooling water outside of the outboard motor 6 from the water inlet 23 into the inside of the outboard motor 6, and a cooling water passage 25 that guides water suctioned in the water inlet 23 to the respective portions of the outboard motor 6. The water pump 24 to be driven by the engine 7 is disposed in the cooling water passage 25 provided inside of the outboard motor 6. The cooling water passage 25 extends from the water inlet 23 to the exhaust passage 22, and extends from the exhaust passage 22 to the engine 7. Cooling water inside of the cooling water passage 25 cools members including the exhaust passage 22 and the oil pan 15, and then cools the engine 7. The cooling water supplied to the water jacket of the engine 7 is guided to the outside of the outboard motor 6 by the cooling water passage 25.

Figure 2:
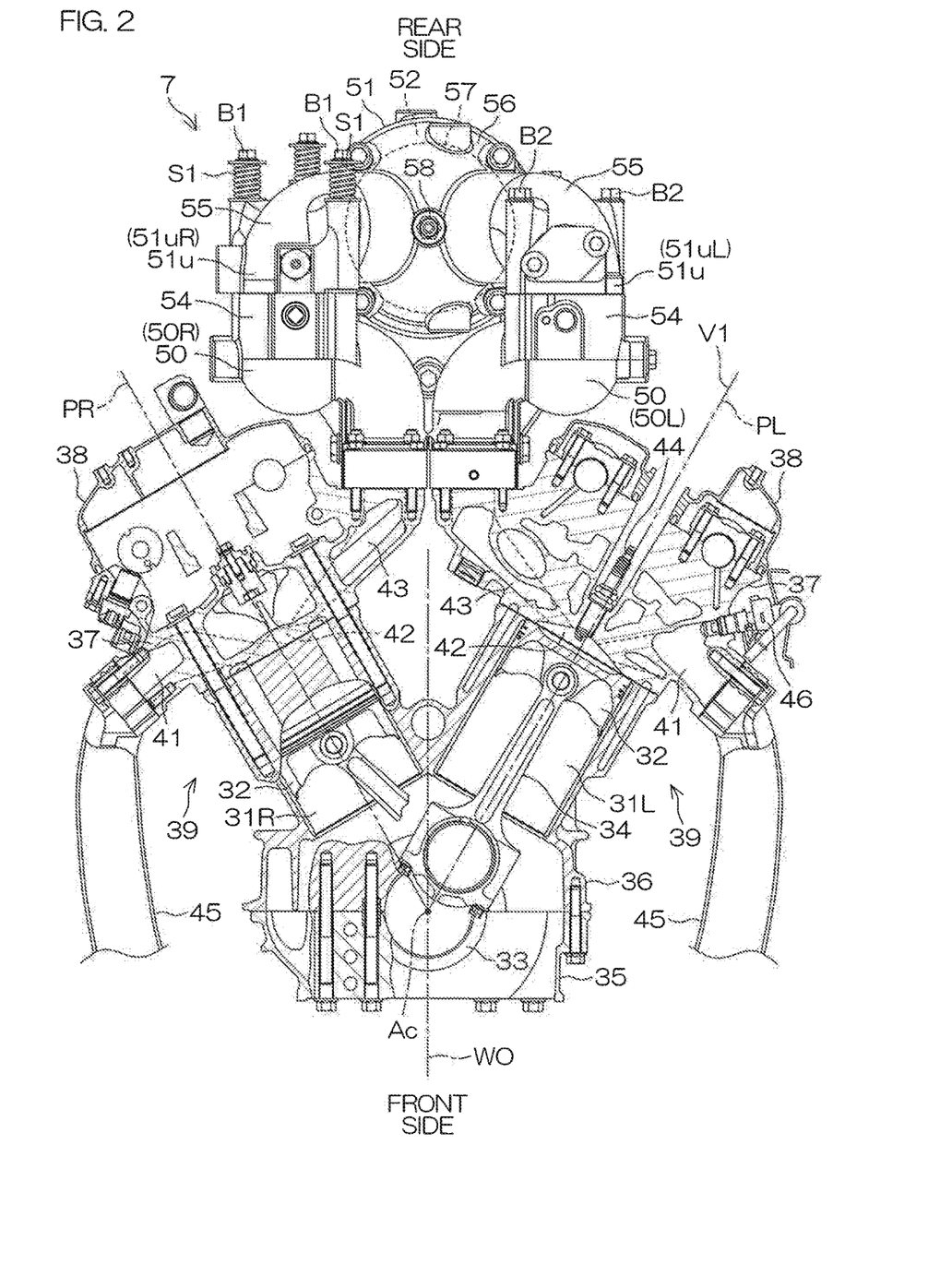
FIG. 2 is a partial sectional view showing a horizontal section of an engine.
Figure 3:
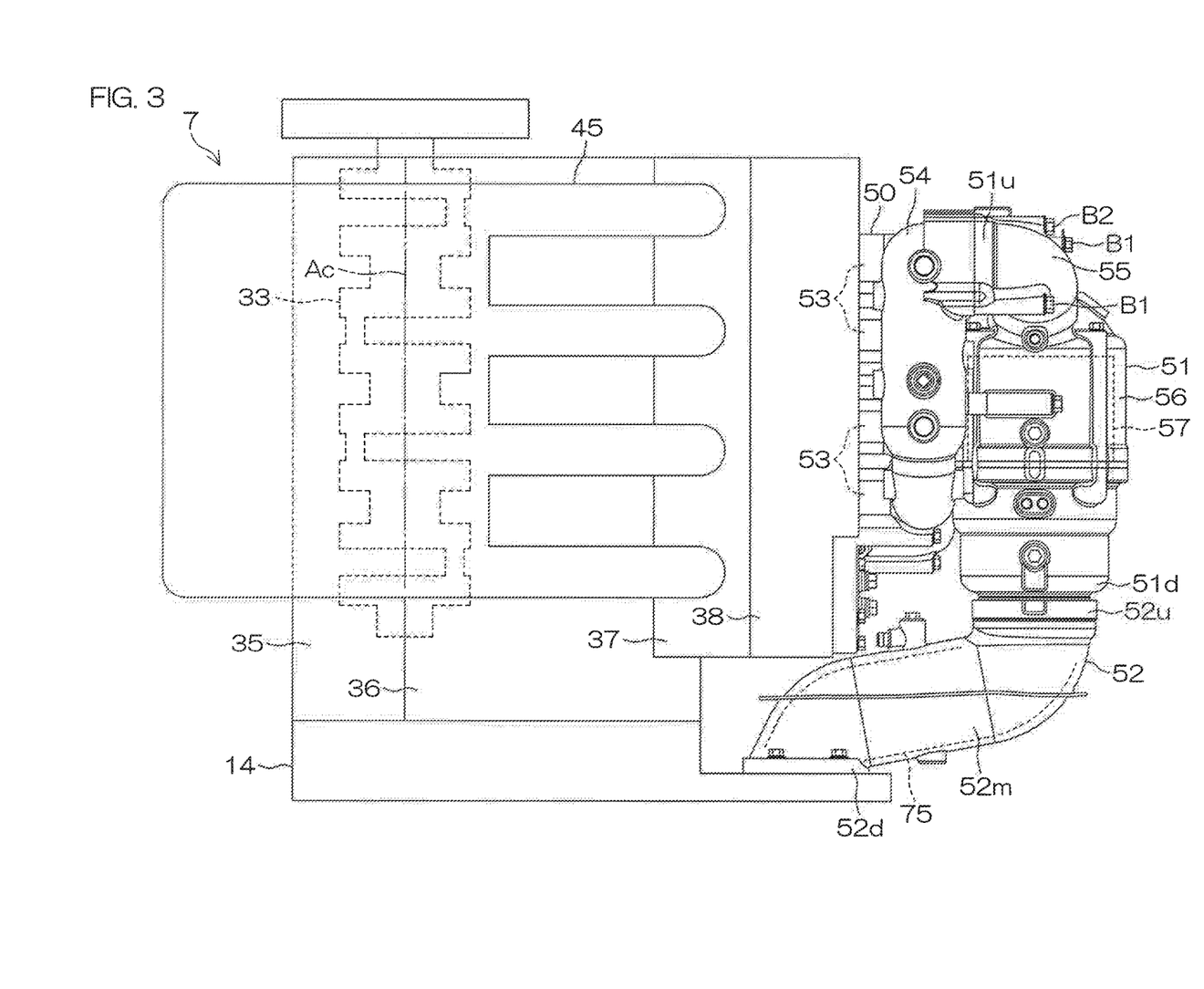
FIG. 3 is a schematic view showing a left side surface of the engine.
Figure 4:
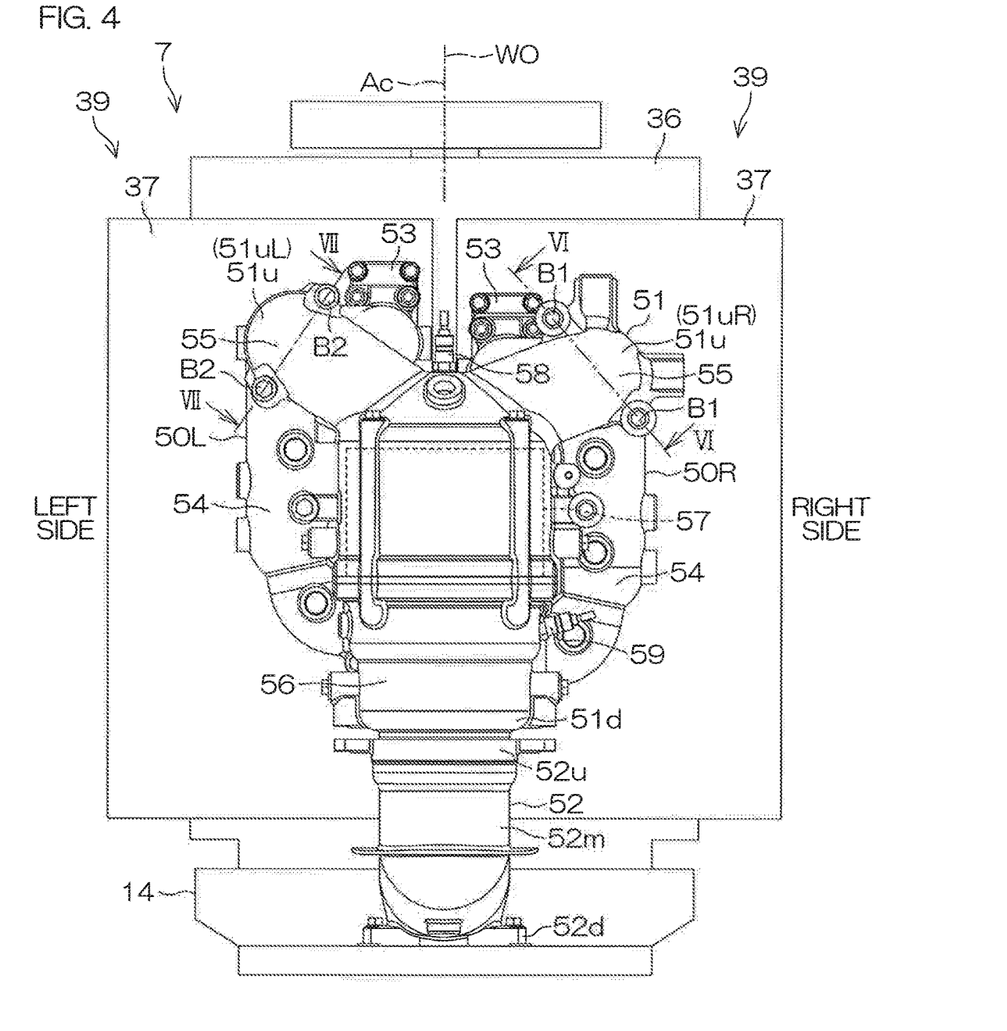
FIG. 4 is a schematic view showing a back surface of the engine.
Figure 5:
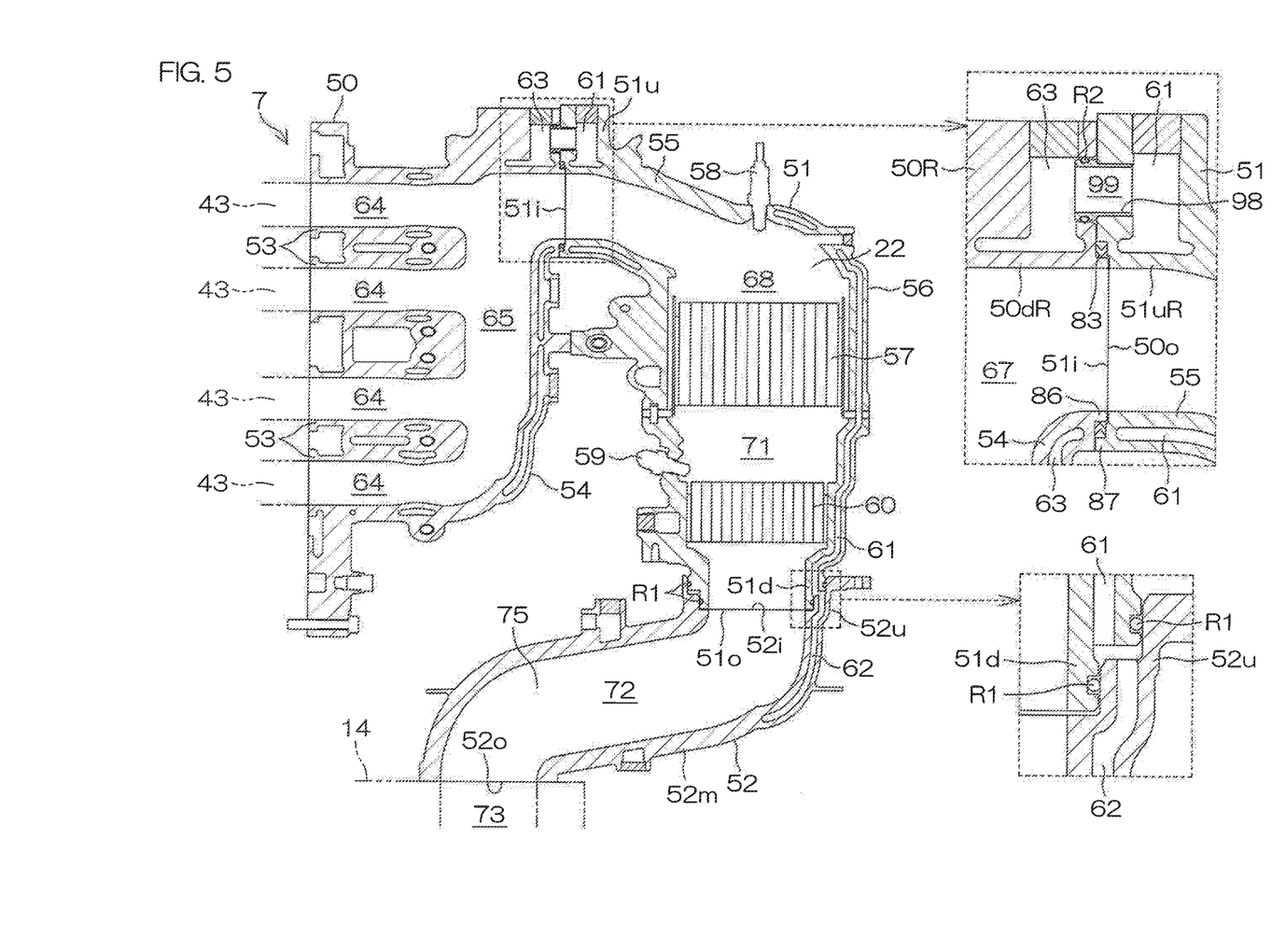
FIG. 5 is a sectional view showing a vertical section of a portion of an exhaust passage.

FIG. 2 is a partial sectional view showing a horizontal section of the engine 7. FIG. 3 is a schematic view showing a left side surface of the engine 7. FIG. 4 is a schematic view showing a back surface of the engine 7. FIG. 5 is a sectional view showing a vertical section of a portion of the exhaust passage 22.

FIG. 2 shows a section that differs in height between the right side and the left side of a center WO (vertical surface that passes through the rotation axis Ac of the crankshaft 33 and is perpendicular or substantially perpendicular to the right-left direction) of the outboard motor 6. In FIG. 3 and FIG. 4, components other than the exhaust manifold 50, the first exhaust pipe 51, and the second exhaust pipe 52, etc., are omitted or simplified.

The engine 7 is preferably a V-type eight-cylinder four-cycle engine, for example. As shown in FIG. 2, the engine 7 includes a plurality of pistons 32 disposed inside a plurality of cylinders 31, respectively, a crankshaft 33 rotatable around a rotation axis Ac extending in the up-down direction, and a plurality of connecting rods 34 that join the plurality of pistons 32 to the crankshaft 33.

As shown in FIG. 2, the engine 7 includes two cylinder banks 39 provided with the plurality of cylinders 31, and a crankcase 35 attached to the respective cylinder banks 39. The two cylinder banks 39 include a cylinder body 36 having a V-shaped configuration that opens rearward in a plan view of the engine 7, two cylinder heads 37 attached to two rear end portions of the cylinder body 36, respectively, and two head covers 38 attached to the two cylinder heads 37, respectively.

The two cylinder banks 39 are disposed on the right side and the left side of the center WO of the outboard motor 6, respectively. The centerlines of the four cylinders 31 aligned in the right cylinder bank 39 are disposed in a first plane PR parallel or substantially parallel to the rotation axis Ac. The centerlines of the four cylinders 31 aligned in the left cylinder bank 39 are disposed in a second plane PL parallel or substantially parallel to the rotation axis Ac. The first plane PR and the second plane PL are symmetrical or substantially symmetrical about the center WO of the outboard motor 6, and are disposed in a V-shape manner in a plan view of the engine 7. A V-shaped line V1 is defined by the first plane PR and the second plane PL, and extends rearward from the rotation axis Ac.

Hereinafter, "first" and "R" may be associated with the beginning and the end of an "element corresponding to the right cylinder bank 39," respectively, and "second" and "L" may be associated with the beginning and the end of an "element corresponding to the left cylinder bank 39," respectively. For example, "cylinder 31 corresponding to the right cylinder bank 39" may be referred to as "first cylinder 31R," and "cylinder 31 corresponding to the left cylinder bank 39" may be referred to as "second cylinder 31L."

As shown in FIG. 2, the cylinder body 36 extends along the V-shaped line V1 in a plan view. The cylinder body 36 defines a plurality of cylinders 31 together with two cylinder heads 37. The two cylinder heads 37 are disposed behind the cylinder body 36, and the crankcase 35 is disposed in front of the cylinder body 36. The crankshaft 33 is disposed inside a housing space defined by the crankcase 35 and the cylinder body 36. As shown in FIG. 3, the crankcase 35 and the cylinder body 36 are disposed on the exhaust guide 14.

As shown in FIG. 2, the two cylinder heads 37 include a plurality of combustion chambers 42 corresponding to the plurality of cylinders 31, respectively, a plurality of intake ports 41 that supply air to the plurality of combustion chambers 42, and a plurality of exhaust ports 43 that discharge exhaust gases generated in the plurality of combustion chambers 42. The engine 7 includes a plurality of ignition plugs 44 that burn an air-fuel mixture in the plurality of combustion chambers 42, a plurality of intake valves that open and close the plurality of intake ports 41, a plurality of exhaust valves that open and close the plurality of exhaust ports 43, and a valve mechanism that moves the pluralities of intake valves and exhaust valves.

The region between the V-shaped line V1 in the right-left direction is the inside of the V-shaped line V1, and the right and left regions of the V-shaped line V1 are the outside of the V-shaped line V1. The intake ports 41 are disposed outside of the V-shaped line V1, and the exhaust ports 43 are disposed inside of the V-shaped line V1. The plurality of intake ports 41 are connected to the plurality of combustion chambers 42, respectively, and the plurality of exhaust ports 43 are connected to the plurality of combustion chambers 42, respectively.

An intake system of the engine 7 includes two intake manifolds 45 that supply air to the plurality of combustion chambers 42 via the plurality of intake ports 41. A fuel supply system of the engine 7 includes a fuel injector 46 that supplies fuel to the plurality of combustion chambers 42. An exhaust system of the engine 7 includes two exhaust manifolds 50 that discharge exhaust gases generated in the plurality of combustion chambers 42 from the plurality of combustion chambers 42 via the plurality of exhaust ports 43, and a first exhaust pipe 51 connected to the two exhaust manifolds 50. As shown in FIG. 3 and FIG. 4, the exhaust system of the engine 7 further includes a second exhaust pipe 52 connected to the first exhaust pipe 51.

As shown in FIG. 2, the intake manifolds 45 and the fuel injector 46 are disposed outside of the V-shaped line V1. The exhaust manifolds 50, the first exhaust pipe 51, and the second exhaust pipe 52 are disposed inside of the V-shaped line V1. The two exhaust manifolds 50 are disposed behind the two cylinder heads 37, respectively. The two exhaust manifolds 50 are members independent from each other, and are arranged side by side in the right-left direction. The first exhaust pipe 51 is disposed behind the two exhaust manifolds 50.

As shown in FIG. 3 and FIG. 4, the second exhaust pipe 52 is disposed below the first exhaust pipe 51. The second exhaust pipe 52 extends from the first exhaust pipe 51 to the exhaust guide 14. The exhaust manifolds 50 and the first exhaust pipe 51 are disposed higher than the exhaust guide 14. The second exhaust pipe 52 is separated from the engine main body including the cylinder heads 37 and the cylinder body 36.

The two exhaust manifolds 50 are fixed to the two cylinder heads 37 by, for example, a plurality of bolts, respectively. The two upstream end portions 51u of the first exhaust pipe 51 are joined to the two exhaust manifolds 50 by, for example, a plurality of bolts, respectively. The upstream end portion 52u of the second exhaust pipe 52 is joined to the downstream end portion 51d of the first exhaust pipe 51 via two O-rings R1 (refer to FIG. 5). The downstream end portion 52d of the second exhaust pipe 52 is fixed to the exhaust guide 14 by, for example, a plurality of bolts.

As shown in FIG. 5, each of the two exhaust manifolds 50 includes a plurality of upstream branch portions 53 connected to the plurality of exhaust ports 43, and an upstream collecting portion 54 connected to the respective upstream branch portions 53. As shown in FIG. 4, the first exhaust pipe 51 includes two downstream branch portions 55 connected to the two upstream collecting portions 54, respectively, and a downstream collecting portion 56 connected to the respective downstream branch portions 55. The second exhaust pipe 52 includes an upstream end portion 52u connected to the downstream collecting portion 56, and a downstream end portion 52d connected to the exhaust guide 14. As shown in FIG. 3, the second exhaust pipe 52 further includes a midstream portion 52m extending toward the crankshaft 33 from the upstream end portion 52u of the second exhaust pipe 52 to the downstream end portion 52d of the second exhaust pipe 52 in a side view.

As shown in FIG. 5, an inlet 51i of the first exhaust pipe 51 is disposed higher than an outlet 51o of the first exhaust pipe 51. The outlet 51o of the first exhaust pipe 51 is positioned below a catalyst 57. A diameter of the outlet 51o of the first exhaust pipe 51 is preferably larger than a diameter of the inlet 51i of the first exhaust pipe 51. A diameter of an inlet 52i of the second exhaust pipe 52 and a diameter of an outlet 52o of the second exhaust pipe 52 are preferably larger than the diameter of the inlet 51i of the first exhaust pipe 51. The inlet 52i of the second exhaust pipe 52 is disposed farther to the rear than the exhaust guide 14. The outlet 52o of the second exhaust pipe 52 is disposed above the exhaust guide 14.

The engine 7 includes the catalyst 57 disposed inside of the exhaust passage 22, an upstream sensor 58 that measures an exhaust gas concentration at a position farther upstream than the catalyst 57, and a downstream sensor 59 that measures an exhaust gas concentration at a position farther downstream than the catalyst 57. The engine 7 further includes a water-resistant member 60 disposed inside of the exhaust passage 22 at a position farther downstream than the downstream sensor 59. The catalyst 57, the upstream sensor 58, the downstream sensor 59, and the water-resistant member 60 are held by the first exhaust pipe 51.

The catalyst 57 is, for example, a three-way catalyst. The catalyst 57 is disposed in a catalyst housing portion provided in the downstream collecting portion 56 of the first exhaust pipe 51. The catalyst 57 is disposed inside a downstream collecting passage 68 of the exhaust passage 22 described below. An outer peripheral portion of the catalyst 57 surrounds the centerline of the exhaust passage 22, and is preferably concentric with the exhaust passage 22. The catalyst 57 includes a honeycomb carrier therein which exhaust gases pass through and a catalytic material on the surface of the carrier.

The catalyst 57 is disposed higher than the exhaust guide 14. The catalyst 57 is disposed at a height lower than the upper end of the plurality of first cylinders 31R and higher than the lower end of the plurality of first cylinders 31R (refer to FIG. 8). The water-resistant member 60 is disposed below the catalyst 57. The upstream sensor 58 is disposed above the catalyst 57, and the downstream sensor 59 is disposed at a height between the catalyst 57 and the water-resistant member 60. Tip end portions of the upstream sensor 58 and the downstream sensor 59 project inward from an inner surface of the first exhaust pipe 51.

Each of the upstream sensor 58 and the downstream sensor 59 are oxygen concentration sensors that detect an oxygen concentration in exhaust gases. Exhaust gases flowing in the exhaust passage 22 come into contact with the tip end portions of the upstream sensor 58 and the downstream sensor 59. The upstream sensor 58 detects an oxygen concentration in the exhaust gases before being purified by the catalyst 57, and the downstream sensor 59 detects an oxygen concentration in the exhaust gases after being purified by the catalyst 57. An air-fuel ratio of the air-fuel mixture to be supplied to the combustion chambers 42 is controlled by an engine control system based on detection values of the upstream sensor 58 and the downstream sensor 59, etc.

The exhaust opening 21 defined by the propeller 11 is disposed in the water, so that water enters the inside of the exhaust passage 22 through the exhaust opening 21. When the pressure inside of the combustion chambers 42 becomes negative (a pressure lower than the atmospheric pressure), water inside of the exhaust passage 22 may flow back in the exhaust passage 22 toward the combustion chambers 42. The water-resistant member 60 has a honeycomb shape that allows gases to pass through and blocks distribution of liquids. Therefore, even if water inside of the exhaust passage 22 reaches the water-resistant member 60, a back flow of the water is blocked by the water-resistant member 60. Accordingly, an amount of water that moves to a position farther upstream than the water-resistant member 60 is significantly reduced or prevented, and the catalyst 57, the upstream sensor 58, and the downstream sensor 59 are prevented from getting wet.

The tubular downstream end portion 51*d* of the first exhaust pipe 51 and the tubular upstream end portion 52*u* of the second exhaust pipe 52 are preferably joined by fitting. FIG. 5 shows an example in which the downstream end portion 51*d* of the first exhaust pipe 51 is inserted inside of the upstream end portion 52*u* of the second exhaust pipe 52. However, the upstream end portion 52*u* of the second exhaust pipe 52 may be inserted inside of the downstream end portion 51*d* of the first exhaust pipe 51. A gap between the first exhaust pipe 51 and the second exhaust pipe 52 is sealed by two O-rings R1 spaced from each other in the axial direction of the exhaust passage 22. Accordingly, exhaust gases are prevented from leaking from the gap between the first exhaust pipe 51 and the second exhaust pipe 52.

The cooling water passage 25 includes a first water passage 61 provided in the first exhaust pipe 51, a second water passage 62 provided in the second exhaust pipe 52, and two third water passages 63 provided in the two exhaust manifolds 50. As shown in an enlarged manner in FIG. 5, the first water passage 61 opens at the downstream end portion 51*d* of the first exhaust pipe 51, and the second water passage 62 opens at the upstream end portion 52*u* of the second exhaust pipe 52. The downstream end portion 51*d* of the first exhaust pipe 51 and the upstream end portion 52*u* of the second exhaust pipe 52 define an annular sealed space surrounding the exhaust passage 22 together with the two O-rings R1. The opening of the first water passage 61 and the opening of the second water passage 62 are disposed in this sealed space.

The first water passage 61 is connected to the second water passage 62 by a connecting portion between the first exhaust pipe 51 and the second exhaust pipe 52. The first water passage 61 is further connected to the third water passage 63 by a connecting portion between the first exhaust pipe 51 and the first exhaust manifold 50R and connected to the third water passage 63 by a connecting portion between the first exhaust pipe 51 and the second exhaust manifold 50L. Cooling water fed by the water pump 24 (refer to FIG. 1) flows from the second water passage 62 to the first water passage 61, and flows from the first water passage 61 to the third water passages 63. Therefore, a plurality of members including the first exhaust pipe 51 and the second exhaust pipe 52 are cooled by the same cooling water. In addition, while the cooling water is prevented from leaking by the two O-rings R1, the cooling water is distributed between the first water passage 61 and the second water passage 62.

Figure 6:
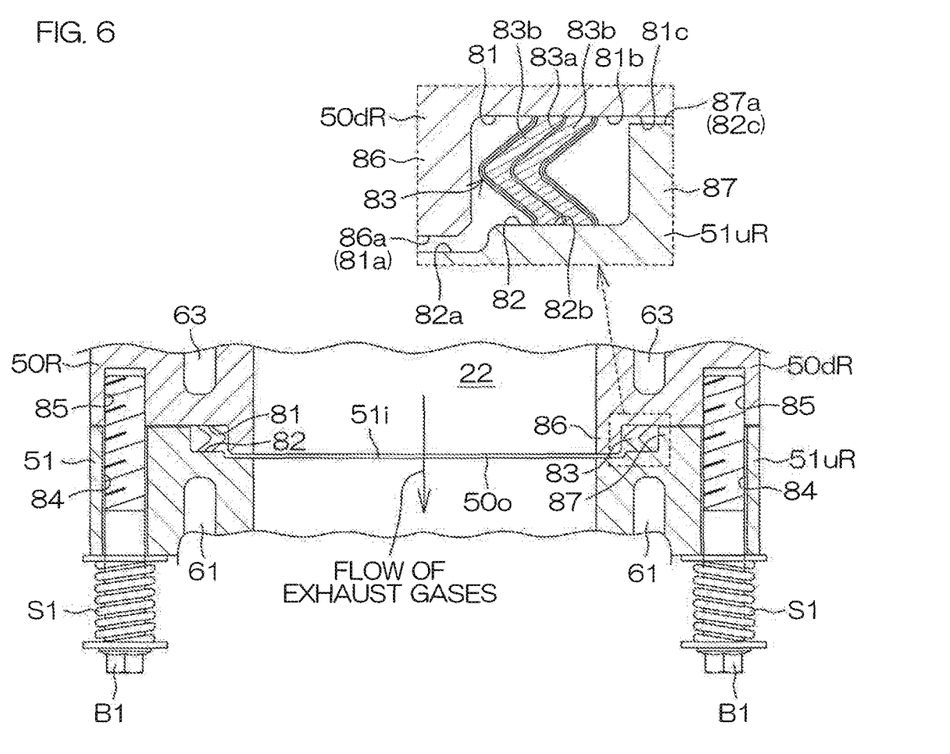
FIG. 6 is a sectional view showing a section of a connecting portion between a first exhaust pipe and a first exhaust manifold, taken along line VI-VI in FIG. 4.
Figure 7:
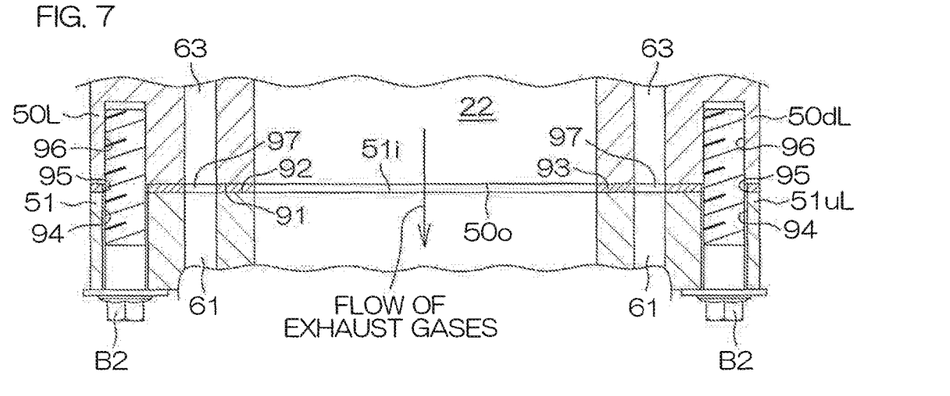
FIG. 7 is a sectional view showing a section of a connecting portion between the first exhaust pipe and a second exhaust manifold, taken along line VII-VII in FIG. 4.

FIG. 6 is a sectional view showing a section of the connecting portion between the first exhaust pipe 51 and the first exhaust manifold 50R, taken along line VI-VI in FIG. 4. FIG. 7 is a sectional view showing a section of the connecting portion between the first exhaust pipe 51 and the second exhaust manifold 50L, taken along line VII-VII in FIG. 4.

As shown in FIG. 7, the second exhaust manifold 50L includes the second downstream end portion 50*d*L defining an exhaust gas outlet 50*o*. The first exhaust pipe 51 includes the second upstream end portion 51*u*L defining an exhaust gas inlet 50*i*. A plate-shaped sheet gasket 93 surrounding the exhaust passage 22 is disposed between a mating surface 92 of the second upstream end portion 51*u*L and a mating surface 91 of the second downstream end portion 50*d*L. Exhaust gases, discharged from the exhaust gas outlet 50*o* open at the mating surface 91 of the second downstream end portion 50*d*L, flow into the exhaust gas inlet 50*i* open at the mating surface 92 of the second upstream end portion 51*u*L.

The second upstream end portion 51*u*L of the first exhaust pipe 51 is fixed to the second downstream end portion 50*d*L of the second exhaust manifold 50L by, for example, a plurality of bolts B2. The second upstream end portion 51*u*L is unmovable with respect to the second downstream end portion 50*d*L. The bolts B2 are an example of a fixing member. Male screws of the bolts B2 pass through holes 94 provided in the second upstream end portion 51*u*L and through holes 95 provided in the sheet gasket 93, and are attached to female screws 96 provided in the second downstream end portion 50*d*L. The sheet gasket 93 is sandwiched in the axial direction of the bolts B2 by the two mating surfaces 91 and 92. The distance between the two mating surfaces 91 and 92 is constant at any position.

On the other hand, as shown in FIG. 6, the first exhaust manifold 50R includes a first downstream end portion 50*d*R defining an exhaust gas outlet 50*o*. The first exhaust pipe 51 includes a first upstream end portion 51*u*R defining an exhaust gas inlet 50*i*. An annular spiral wound gasket 83 surrounding the exhaust passage 22 is disposed between a mating surface 82 of the first upstream end portion 51*u*R and a mating surface 81 of the first downstream end portion 50*d*R. Exhaust gases, discharged from the exhaust gas outlet 50*o* open at the mating surface 81 of the first downstream end portion 50*d*R, flow into the exhaust gas inlet 50*i* open at the mating surface 82 of the first upstream end portion 51*u*R.

The first upstream end portion 51*u*R of the first exhaust pipe 51 is fastened to the first downstream end portion 50*d*R of the first exhaust manifold 50R by, for example, a plurality of bolts B1 via a plurality of springs S1. Male screws of the bolts B1 pass through holes 84 provided in the first upstream end portion 51*u*R and are attached to female screws 85 provided in the first downstream end portion 50*d*R. The plurality of bolts B1 are inserted into the plurality of springs S1, respectively. The springs S1 are interposed between the head portions of the bolts B1 and the back surface of the first upstream end portion 51*u*R. The springs S1 are compression coil springs. The springs S1 are compressed in the axial direction of the bolts B1 between the bolts B1 and the first upstream end portion 51*u*R.

The first upstream end portion 51*u*R is movable in the axial direction of the bolts B1 with respect to the first downstream end portion 50*d*R within an elastic region of the springs S1. When the first exhaust pipe 51, etc., expands or contracts due to a temperature change, the springs S1 expand or contract. When the first upstream end portion 51*u*R is fastened to the first downstream end portion 50*d*R by the bolts B1, a tightening force that compresses the spiral wound gasket 83 in the axial direction is generated. Since the springs S1 are interposed between the bolts B1 and the first upstream end portion 51*u*R, even if the first exhaust pipe 51, etc., expands or contracts, fluctuation of the tightening force is reduced.

As shown in an enlarged manner in FIG. 6, the spiral wound gasket 83 is preferably a semi-metal gasket including a hoop 83*a* made of a metal and a nonmetallic filler 83*b*. The hoop 83*a* and the filler 83*b* have thin belt shapes, and are spirally wound in a superposed manner. An outer peripheral surface and an inner peripheral surface of the spiral wound gasket 83 are preferably made of metal members. The metal members may be portions of the hoop 83*a*, or may be members separate from the hoop 83*a*.

Sections of the hoop 83*a* and the filler 83*b* perpendicular or substantially perpendicular to the circumferential direction of the spiral wound gasket 83 have V-shaped configurations that open outward. The hoop 83*a* is made of a metal material such as stainless steel. The filler 83*b* is made of a nonmetallic material such as expanded graphite, inorganic paper, or a resin. The filler 83b is softer than the hoop 83a. The filler 83b functions as a seal that seals a gap between two mating surfaces. The hoop 83a is an elastic body supporting the filler 83b.

The spiral wound gasket 83 is softer than the sheet gasket 93 made of a material such as a metal or carbon fiber, and harder than O-rings made of a resin or rubber. In other words, a longitudinal elastic modulus (Young's modulus) of the entire spiral wound gasket 83 including the hoop 83a and the filler 83b is lower than a longitudinal elastic modulus of the sheet gasket 93, and higher than a longitudinal elastic modulus of the O-rings. The spiral wound gasket 83 has a pressure resistance and a heat resistance higher than those of the O-rings.

As shown in FIG. 6, the mating surface 81 of the first downstream end portion 50dR of the first exhaust manifold 50R includes an annular inner peripheral portion 81a, an annular intermediate portion 81b disposed farther outside than the inner peripheral portion 81a, and an annular outer peripheral portion 81c disposed farther outside than the intermediate portion 81b. The inner peripheral portion 81a is disposed at a position farther downstream than the intermediate portion 81b. The inner peripheral portion 81a corresponds to a tip end surface 86a of the inner cylinder portion 86 provided at the first downstream end portion 50dR. The intermediate portion 81b corresponds to a seating surface that comes into contact with the spiral wound gasket 83. The intermediate portion 81b is disposed in the same plane as the outer peripheral portion 81c.

The mating surface 82 of the first upstream end portion 51uR of the first exhaust pipe 51 includes an annular inner peripheral portion 82a, an annular intermediate portion 82b disposed farther outside than the inner peripheral portion 82a, and an annular outer peripheral portion 82c disposed farther outside than the intermediate portion 82b. The inner peripheral portion 82a is disposed at a position farther downstream than the intermediate portion 82b. The inner peripheral portion 82a may be disposed in the same plane as the intermediate portion 82b. The intermediate portion 82b corresponds to a seating surface that comes into contact with the spiral wound gasket 83. The intermediate portion 82b is disposed at a position farther downstream than the outer peripheral portion 82c. The outer peripheral portion 82c corresponds to a tip end surface 87a of an outer cylinder portion 87 provided at the first upstream end portion 51uR.

An inner peripheral surface of an inner cylinder portion 86 provided in the first exhaust manifold 50R defines a portion of the exhaust passage 22. The range from an inner peripheral surface of the inner cylinder portion 86 to an outer peripheral surface of the inner cylinder portion 86 is solid across the entire circumference of the inner cylinder portion 86. The spiral wound gasket 83 surrounds the inner cylinder portion 86. The spiral wound gasket 83 is blocked by the inner cylinder portion 86, and does not face the exhaust passage 22. An inner peripheral surface of the outer cylinder portion 87 provided in the first exhaust pipe 51 surrounds the spiral wound gasket 83. The spiral wound gasket 83 is disposed between the outer peripheral surface of the inner cylinder portion 86 and the inner peripheral surface of the outer cylinder portion 87. The male screws of the bolts B1 are disposed around or outside of the spiral wound gasket 83.

The spiral wound gasket 83 is sandwiched in the axial direction by the intermediate portion 82b of the first upstream end portion 51uR and the intermediate portion 81b of the first downstream end portion 50dR. The spiral wound gasket 83 is interposed between the first upstream end portion 51uR and the first downstream end portion 50dR, so that the first upstream end portion 51uR is separated from the first exhaust manifold 50R along the entire region of the first upstream end portion 51uR. In detail, a tip end surface 86a of the inner cylinder portion 86 is separated from the mating surface 82 of the first upstream end portion 51uR. Similarly, a tip end surface 87a of the outer cylinder portion 87 is separated from the mating surface 81 of the first downstream end portion 50dR. The distance between the intermediate portion 81b and the intermediate portion 82b is larger than the distance from the tip end surface 86a of the inner cylinder portion 86 to the mating surface 82 of the first upstream end portion 51uR, and larger than the distance from the tip end surface 87a of the outer cylinder portion 87 to the mating surface 81 of the first downstream end portion 50dR.

When the spiral wound gasket 83 is sandwiched between the two mating surfaces 81 and 82 by a predetermined tightening force in the axial direction of the spiral wound gasket 83, the hoop 83a elastically deforms in the axial direction, and the filler 83b comes into close contact with the two mating surfaces 81 and 82. Accordingly, the gap between the two mating surfaces 81 and 82 is sealed by the filler 83b. Even if the distance between the two mating surfaces 81 and 82 increases or decreases, the state in which the filler 83b is in close contact with the two mating surfaces 81 and 82 is maintained by the elasticity of the hoop 83a supporting the filler 83b. That is, the spiral wound gasket 83 follows the two mating surfaces 81 and 82 due to the elasticity of the hoop 83a. Therefore, even if conditions such as the tightening force rapidly change, excellent sealing performance is maintained.

The two cylinder heads 37 are fixed to the cylinder body 36. The first exhaust manifold 50R and the second exhaust manifold 50L are fixed to the two cylinder heads 37, respectively. The first upstream end portion 51uR of the first exhaust pipe 51 is joined to the first exhaust manifold 50R, and the second upstream end portion 51uL of the first exhaust pipe 51 is fixed to the second exhaust manifold 50L. The respective components of the engine 7 have dimensional tolerances, so that the position of the first exhaust pipe 51 with respect to the first exhaust manifold 50R and the second exhaust manifold 50L is not constant but varies by engine 7.

When both of the first upstream end portion 51uR and the second upstream end portion 51uL are fixed to the first exhaust manifold 50R and the second exhaust manifold 50L, a gap caused by dimensional variation is generated between the first upstream end portion 51uR and the first downstream end portion 50dR or between the second upstream end portion 51uL and the second downstream end portion 50dL, and the sealing performance may deteriorate. Therefore, by interposing the elastically deformable spiral wound gasket 83 between the first upstream end portion 51uR and the first downstream end portion 50dR, a cumulative value of dimensional errors is absorbed. Accordingly, dimensional errors are absorbed while achieving an excellent sealing performance.

As shown in FIG. 6, the first water passage 61 does not open at the mating surface 82 of the first upstream end portion 51uR, but is closed in the first upstream end portion 51uR. Similarly, the third water passage 63 does not open at the mating surface 81 of the first downstream end portion 50dR, but is closed in the first downstream end portion 50dR. Therefore, the first water passage 61 and the third water passage 63 are divided by the two mating surfaces 81 and 82.

On the other hand, as shown in FIG. 7, the first water passage 61 opens at the mating surface 92 of the second upstream end portion 51uL. Similarly, the third water passage 63 opens at the mating surface 91 of the second downstream end portion 50dL. The openings of the first water passage 61 and the third water passage 63 face each other via a slot 97 that penetrates through the sheet gasket 93 in the thickness direction. Therefore, the first water passage 61 is connected to the third water passage 63 via the sheet gasket 93.

As shown in an enlarged manner in FIG. 5, the first water passage 61 and the third water passage 63 are connected by a connecting portion between the first upstream end portion 51uR and the first downstream end portion 50dR via a cooling water pipe 98. An inner peripheral surface of the cooling water pipe 98 defines a communication passage 99 that connects the first water passage 61 provided in the first exhaust pipe 51 and the third water passage 63 provided in the first exhaust manifold 50R. The cooling water flows from the first water passage 61 to the third water passage 63 through the communication passage 99 included in the cooling water passage 25.

The cooling water pipe 98 is disposed around the spiral wound gasket 83. The cooling water pipe 98 is positioned above the spiral wound gasket 83. The cooling water pipe 98 is disposed at a position more distant than the spiral wound gasket 83 from the exhaust passage 22.

One end portion (left end portion in FIG. 5) of the cooling water pipe 98 is inserted in an insertion hole provided in the first exhaust manifold 50R. An O-ring R2 surrounding one end portion of the cooling water pipe 98 is fitted in an annular grove provided at the outer peripheral portion of the cooling water pipe 98. A gap between an outer peripheral surface of the cooling water pipe 98 and an inner peripheral surface of the insertion hole is sealed by the O-ring R2.

On the other hand, the other end portion (right end portion in FIG. 5) of the cooling water pipe 98 is preferably press-fitted in an insertion hole provided in the first exhaust pipe 51. Accordingly, the other end portion of the cooling water pipe 98 is fixed to the first exhaust pipe 51, and a space between the outer peripheral surface of the cooling water pipe 98 and the inner peripheral surface of the insertion hole is sealed.

Figure 8:
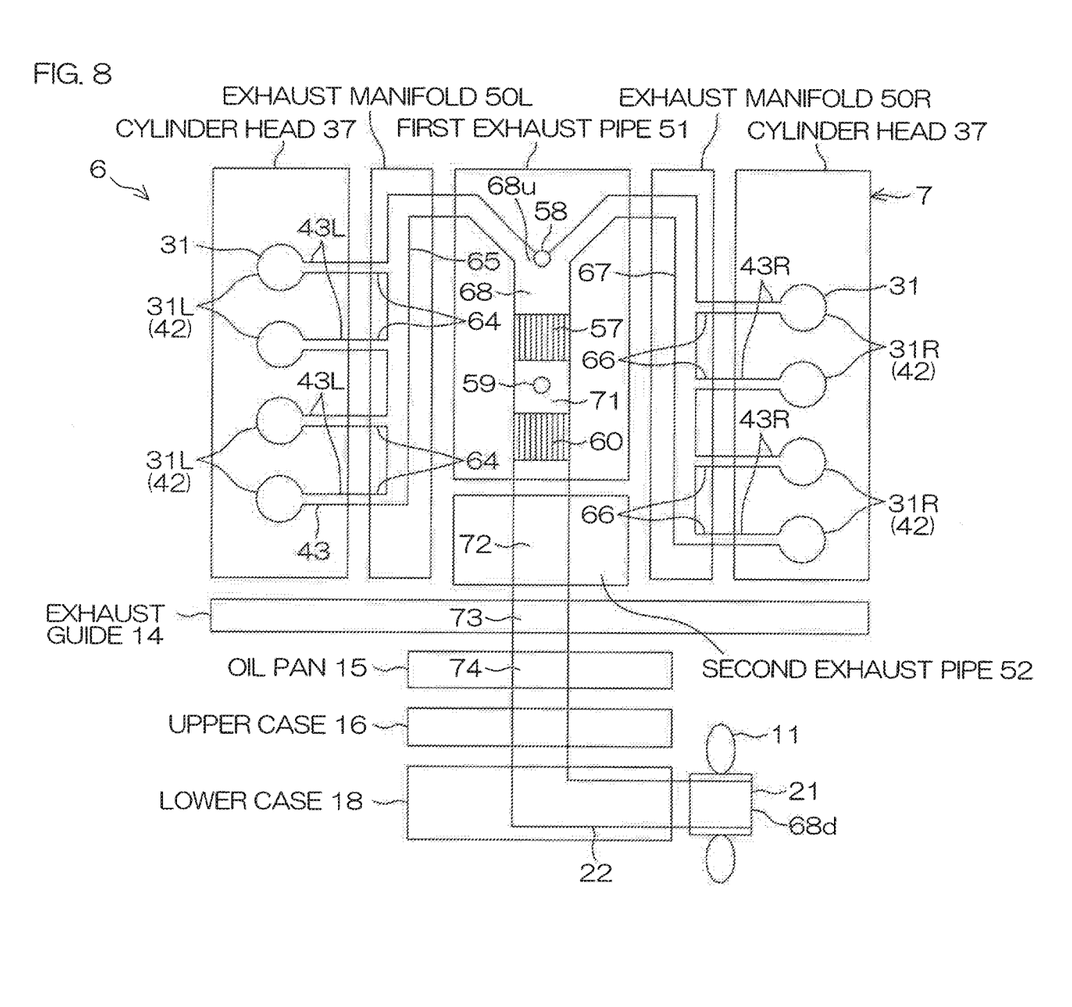
FIG. 8 is a conceptual diagram showing the entire exhaust passage.

FIG. 8 is a conceptual diagram showing the entire exhaust passage 22. Hereinafter, the exhaust passage 22 is described with reference to FIG. 5 and FIG. 8.

The exhaust passage 22 includes a plurality of branch passages 66 extending downstream from a plurality of first exhaust ports 43R corresponding to the plurality of first cylinders 31R, respectively, and a first upstream collecting passage 67 extending downstream from each of the first branch passages 66. Similarly, the exhaust passage 22 includes a plurality of second branch passages 64 extending downstream from a plurality of exhaust ports 43L corresponding to the plurality of second cylinders 31L, respectively, and a second upstream collecting passage 65 extending downstream from each of the second branch passages 64. The exhaust passage 22 further includes a downstream collecting passage 68 extending downstream from each of the first upstream collecting passage 67 and the second upstream collecting passage 65.

The first branch passages 66 are defined by the upstream branch portions 53 of the first exhaust manifold 50R. The second branch passages 64 are defined by the upstream branch portions 53 of the second exhaust manifold 50L. The plurality of first branch passages 66 join together inside of the first exhaust manifold 50R, and the plurality of second branch passages 64 join together inside of the second exhaust manifold 50L. The two exhaust manifolds 50 are disposed inside of the V-shaped line V1, so that the first branch passages 66 and the second branch passages 64 are positioned inside of the V-shaped line V1.

The first upstream collecting passage 67 is defined by the upstream collecting portion 54 of the first exhaust manifold 50R and one downstream branch portion 55 of the first exhaust pipe 51. The second upstream collecting passage 65 is defined by the upstream collecting portion 54 of the second exhaust manifold 50L and the other downstream branch portion 55 of the first exhaust pipe 51. The first upstream collecting passage 67 and the second upstream collecting passage 65 are positioned inside of the V-shaped line V1. The first upstream collecting passage 67 and the second upstream collecting passage 65 join together inside of the first exhaust pipe 51. The first upstream collecting passage 67 and the second upstream collecting passage 65 define a Y-shaped passage having a Y shape in a rear view of the exhaust passage 22 together with the downstream collecting passage 68.

The downstream collecting passage 68 extends from the junction of the first upstream collecting passage 67 and the second upstream collecting passage 65 to the exhaust opening 21 open at the propeller 11 through the inside of the casing 13 including the exhaust guide 14 and the oil pan 15. The downstream collecting passage 68 includes a first passage 71 defined by the downstream collecting portion 56 of the first exhaust pipe 51, a second passage 72 defined by the second exhaust pipe 52, a third passage 73 defined by the exhaust guide 14, and a fourth passage 74 defined by the oil pan 15. The second passage 72 includes an approaching portion 75 (refer to FIG. 3) that extends toward the crankshaft 33 downstream in the flow direction of exhaust gases. The approaching portion 75 is disposed higher than the exhaust guide 14.

Exhaust gases generated in the two cylinder heads 37 are discharged to the two exhaust manifolds 50 disposed inside of the V-shaped line V1. Exhaust gases discharged to the two exhaust manifolds 50 flow inside of the first exhaust pipe 51 and are purified by the catalyst 57. The exhaust gases purified inside of the first exhaust pipe 51 pass through the second exhaust pipe 52, the exhaust guide 14, the oil pan 15, the upper case 16, and the lower case 18 in this order, and are discharged into the water from the propeller 11. Accordingly, exhaust gases generated in the plurality of cylinders 31 are discharged into the water.

As described above, in the present preferred embodiment, exhaust gases generated in the first cylinders 31R and the second cylinders 31L are collected at the first exhaust pipe 51 via the first exhaust manifold 50R and the second exhaust manifold 50L disposed inside of the V-shaped line V1. The elastically deformable spiral wound gasket 83 is disposed between the first exhaust manifold 50R and the first upstream end portion 51uR of the first exhaust pipe 51. The gap between the first exhaust manifold 50R and the first upstream end portion 51uR is sealed by the spiral wound gasket 83. Further, dimensional errors of the first exhaust manifold 50R, etc., are absorbed by the elasticity of the spiral wound gasket 83. Therefore, both an excellent sealing performance and absorption of dimensional errors are achieved. Further, unlike the case where O-rings are used, the insertion hole and annular grooves are not necessary, so that the structure is prevented from becoming complicated.

In the present preferred embodiment, the second upstream end portion 51uL of the first exhaust pipe 51 is fixed to the second exhaust manifold 50L by bolts B2 as fixing members, for example. The distance between the second exhaust manifold 50L and the second upstream end portion 51uL is maintained constant, so that dimensional errors are hardly absorbed by the connecting portion between the second exhaust manifold 50L and the second upstream end portion 51uL. That is, when dimensional errors occur, the distance between the first exhaust manifold 50R and the first upstream end portion 51uR changes. However, the elastically deformable gasket 83 is disposed between the first exhaust manifold 50R and the first exhaust pipe 51, so that the dimensional errors are absorbed while achieving an excellent sealing performance. Therefore, although a simplified connecting structure is used in the connecting portion between the second exhaust manifold 50L and the second upstream end portion 51uL, both an excellent sealing performance and absorption of dimensional errors are achieved.

In the present preferred embodiment, along the entire region of the first upstream end portion 51uR of the first exhaust pipe 51, the first upstream end portion 51uR is separated from the first exhaust manifold 50R. Therefore, elastic deformation of the spiral wound gasket 83 is not prevented by contact between the first upstream end portion 51uR and the first exhaust manifold 50R. Therefore, the first upstream end portion 51uR is movable with respect to the first downstream end portion 50dR within the elastic region of the spiral wound gasket 83. Accordingly, dimensional errors are reliably absorbed by the spiral wound gasket 83.

In the present preferred embodiment, the spiral wound gasket 83 surrounds the inner cylinder portion 86 provided in the first exhaust manifold 50R. The spiral wound gasket 83 is prevented from moving in the radial directions of the spiral wound gasket 83 by the inner cylinder portion 86. Accordingly, an amount of eccentricity of the spiral wound gasket 83 with respect to the inner cylinder portion 86 is significantly reduced or prevented, and the spiral wound gasket 83 is accurately centered.

In the present preferred embodiment, the spiral wound gasket 83 surrounds the solid inner cylinder portion 86. An O-ring is normally lower in heat resistance than the spiral wound gasket 83. Therefore, when an O-ring is disposed around the inner cylinder portion 86, a passage inside which cooling water flows is provided inside of the inner cylinder portion 86 to cool the O-ring. That is, the inner cylinder portion 86 must be hollow. On the other hand, in the case where the spiral wound gasket 83 is used, such a passage is not necessary. That is, the inner cylinder portion 86 may be solid. Therefore, as compared with the case where an O-ring is used, the structure of the inner cylinder portion 86 is simplified.

In the present preferred embodiment, not only the spiral wound gasket 83 but also springs S1 are provided at the connecting portion between the first exhaust manifold 50R and the first exhaust pipe 51. When the first exhaust manifold 50R, etc., expands or contracts according to a temperature change, dimensional changes of the first exhaust manifold 50R, etc., are absorbed by the elasticity of the springs S1 and the spiral wound gasket 83. Therefore, even if the dimensions of the first exhaust manifold 50R, etc., change according to a temperature change, an excellent sealing performance is achieved.

In the present preferred embodiment, exhaust gases that have flowed from the first upstream end portion 51uR into the first exhaust pipe 51 and exhaust gases that have flowed from the second upstream end portion 51uL into the first exhaust pipe 51 gather in the downstream collecting portion 56 of the first exhaust pipe 51. These exhaust gases are purified by the catalyst 57 disposed in the downstream collecting portion 56. Thus, exhaust gases generated in both of the first cylinders 31R and the second cylinders 31L are collected at one point, so that all exhaust gases are purified by one catalyst 57. Therefore, the number of components is reduced.

In the present preferred embodiment, the first upstream end portion 51uR of the first exhaust pipe 51 is fastened to the first downstream end portion 50dR of the first exhaust manifold 50R by the bolts B1. When dimensional errors are absorbed by the connecting portion between the first exhaust pipe 51 and the first exhaust manifold 50R, and an O-ring is used as a sealing member to seal the connecting portion, the first exhaust pipe 51 and the first exhaust manifold 50R are normally not fastened by the bolts B1. This is because if the bolts B1 are used, dimensional errors cannot be absorbed by the connecting portion. On the other hand, in the present preferred embodiment, even if the first exhaust pipe 51 and the first exhaust manifold 50R are fastened by the bolts B1, the function of the spiral wound gasket 83 to absorb dimensional errors is not lost. Therefore, as compared with the case where an O-ring is used, the joint strength between the first exhaust pipe 51 and the first exhaust manifold 50R is improved.

Figure 9:
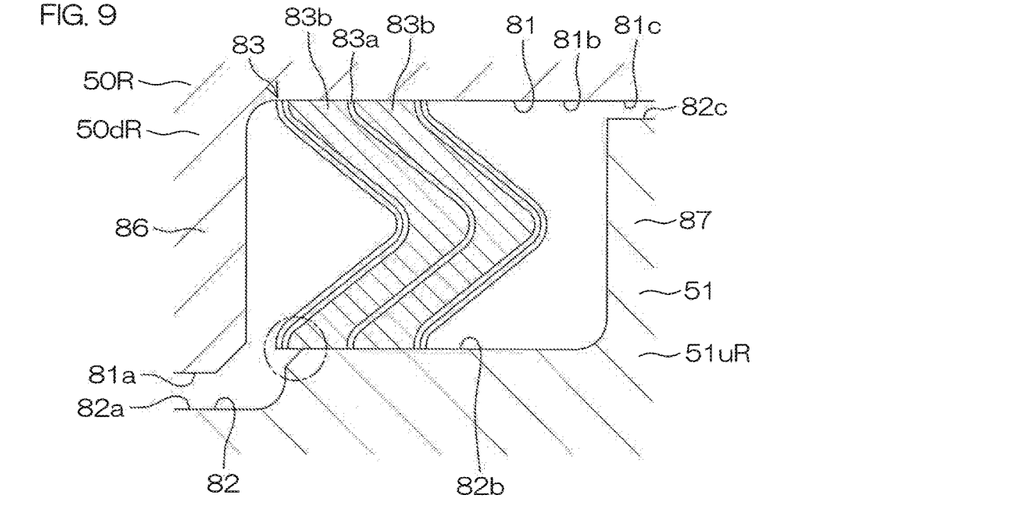
FIG. 9 is a sectional view showing a section of a spiral wound gasket according to another preferred embodiment of the present invention.

In the present preferred embodiment, a section of the spiral wound gasket 83 at an arbitrary position in the circumferential direction has a V-shaped configuration that opens outward. As shown in FIG. 9, a section of the spiral wound gasket 83 may have a V-shaped configuration that opens inward. As shown in an enlarged manner in FIG. 6, both end surfaces of the spiral wound gasket 83 are entirely in contact with the mating surfaces 81 and 82. On the other hand, in FIG. 9, one end surface (lower end surface in FIG. 9) of the spiral wound gasket 83 is only partially in contact with the mating surface 82 (refer to the circle drawn with an alternate long and short dashed line). Therefore, by shaping the spiral wound gasket 83 so as to have a section having a V-shaped configuration that opens outward, the contact area between the spiral wound gasket 83 and the mating surfaces 81 and 82 increases, and stable sealing performance is achieved.

Although preferred embodiments of the present invention have been described above, the present invention is not restricted to the contents of the preferred embodiments and various modifications are possible within the scope of the present invention.

For example, the total number of cylinders 31 provided in the engine 7 is not limited to 8, and may be 6.

In the above-described preferred embodiments, a case where the oil pan 15 is preferably disposed above the upper case 16 is described. However, the oil pan 15 may be disposed inside of the upper case 16. In this case, the oil pan 15 may be integral and unitary with the upper case 16.

At least a portion of the exhaust manifold 50 may be integral and unitary with the cylinder head 37. For example, the plurality of upstream branch portions 53 of the exhaust manifold 50 may be integral and unitary with the cylinder head 37, and the upstream collecting portion 54 of the exhaust manifold 50 may be fixed to the cylinder head 37 by fixing members such as bolts.

The outboard motor 6 may include a plurality of catalysts 57. On the contrary, the outboard motor 6 may not include any catalysts 57. Similarly, the outboard motor 6 may not include the water-resistant member 60.

The exhaust sensor (the upstream sensor 58 and the downstream sensor 59) may be provided only upstream of the catalyst 57. The exhaust sensor is not limited to an oxygen concentration sensor, but may be a temperature sensor that detects a temperature of exhaust gases.

The catalyst 57 is not limited to being disposed inside of the V-shaped line V1, but may be disposed outside of the V-shaped line V1. The position of the catalyst 57 in the up-down direction is not limited to a position between the upper end of the plurality of first cylinders 31R and the lower end of the plurality of first cylinders 31R, but may be a position lower than the lower end of the plurality of first cylinders 31R.

The downstream collecting passage 68 may not include the approaching portion 75 that extends toward the crankshaft 33 downstream in the flow direction of exhaust gases. In detail, in a case where the exhaust guide 14 is disposed below the first exhaust pipe 51, the second exhaust pipe 52 may be a straight pipe extending from the first exhaust pipe 51 to the exhaust guide 14.

The first water passage 61 provided in the first exhaust pipe 51 and the second water passage 62 provided in the second exhaust pipe 52 may not be connected by the connecting portion between the first exhaust pipe 51 and the second exhaust pipe 52. In detail, two water supply channels to supply cooling water to the first water passage 61 and the second water passage 62, respectively, may be provided in the cooling water passage 25.

In the above-described preferred embodiments, the case where the second exhaust pipe 52 is preferably a member separate from the first exhaust pipe 51 and the exhaust guide 14 is described. However, at least a portion of the second exhaust pipe 52 may be integral and unitary with the exhaust guide 14.

In the above-described preferred embodiments, the case where the downstream collecting passage 68 preferably passes through the insides of the exhaust guide 14 and the oil pan 14 is described. However, the downstream collecting passage 68 may be disposed outside at least one of the exhaust guide 14 and the oil pan 15. For example, a portion from the upstream end 68u of the downstream collecting passage 68 to the downstream end 68d of the downstream collecting passage 68 may be disposed outside both of the exhaust guide 14 and the oil pan 15. With this arrangement, the downstream collecting passage 68 is arranged separately from the exhaust guide 14 and the oil pan 15.

The case where the second upstream end portion 51uL of the first exhaust pipe 51 is preferably connected to the second exhaust manifold 50L via the sheet gasket 93 is described above. However, similar to the first upstream end portion 51uR of the first exhaust pipe 51, the second upstream end portion 51uL may be connected to the second exhaust manifold 50L via the spiral wound gasket 83. In this case, dimensional errors are dispersed in two spiral wound gaskets 83, so that even if greater dimensional errors occur, an excellent sealing performance is achieved.

The case where the first upstream end portion 51uR of the first exhaust pipe 51 is preferably separated from the first exhaust manifold 50R along the entire region of the first upstream end portion 51uR is described above. However, a portion of the first upstream end portion 51uR may be in contact with the first exhaust manifold 50R. In this case, a compression amount of the spiral wound gasket 83 is limited.

The case where the inner cylinder portion 86 is preferably surrounded by the spiral wound gasket 83 in the first exhaust manifold 50R is described above. However, the inner cylinder portion 86 may be provided in the first upstream end portion 51uR of the first exhaust pipe 51, or may be omitted.

The same applies to the outer cylinder portion 87 surrounding the spiral wound gasket 83.

The case where the inner cylinder portion 86 provided in the first exhaust manifold 50R is preferably solid, and a passage in which cooling water flows is preferably not provided inside of the inner cylinder portion 86, is described above. However, a passage in which cooling water flows may be provided inside of the inner cylinder portion 86.

The case where the springs S1 are preferably interposed between the head portions of the bolts B1 and the first upstream end portion 51uR of the first exhaust pipe 51 is described above. However, as shown in FIG. 10, the springs S1 may be omitted.

The case where the cooling water pipe 98 is preferably disposed above the spiral wound gasket 83 is described above. However, the cooling water pipe 98 may be disposed below the spiral wound gasket 83 or may be disposed lateral to the spiral wound gasket 83. That is, the cooling water pipe 98 may be disposed at any position as long as the position is around the spiral wound gasket 83.

In the above-described preferred embodiments, the case where the first water passage 61 and the third water passage 63 preferably do not open at the mating surface 82 and the mating surface 81 as shown in FIG. 6 is described. However, as shown in FIG. 10, the first water passage 61 and the third water passage 63 may be open at the mating surface 82 and the mating surface 81, and may face each other via a space between the mating surface 82 and the mating surface 81.

Figure 10:
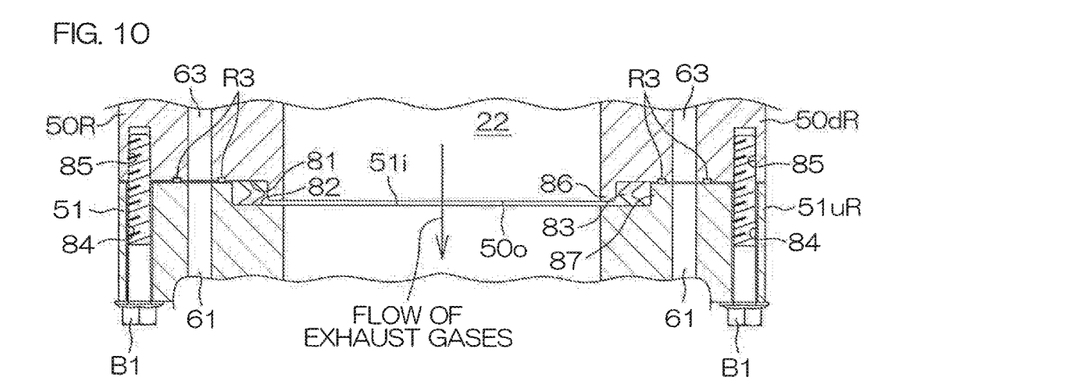
FIG. 10 is a sectional view showing a section of a connecting portion between a first exhaust pipe and a first exhaust manifold according to still another preferred embodiment of the present invention.

In FIG. 10, two O-rings R3 surrounding the exhaust passage 22 at positions outward from the spiral wound gasket 83 are sandwiched by the first exhaust manifold 50R and the first exhaust pipe 51. The openings of the first water passage 61 and the third water passage 63 are positioned between the two O-rings R3 in radial directions. Accordingly, water is prevented from leaking from between the first exhaust manifold 50R and the first exhaust pipe 51. Further, with this arrangement, the cooling water pipe 98 shown in FIG. 5 can be omitted.

The case where the exhaust passage 22 preferably does not pass through the cylinder heads 37 and the cylinder body 36 in a region from the first exhaust pipe 51 to the exhaust guide 14 is described above. However, the exhaust passage 22 may extend from the first exhaust pipe 51 to the exhaust guide 14 via the cylinder heads 37 and the cylinder body 36.

The case where exhaust gases generated in the first cylinders 31R and the second cylinders 31L preferably gather in the first exhaust pipe 51 is described above. However, a passage in which exhaust gases generated in the first cylinder 31R flow and a passage in which exhaust gases generated in the second cylinder 31L flow may be provided independently in the first exhaust pipe 51. In this case, the two passages preferably join together at the exhaust guide 14. In addition, one catalyst 57 may be disposed in both passages. For example, a penetrating portion that connects the two passages may be provided in a partition that partitions the two passages, and from this penetrating portion, the catalyst 57 may project toward both of the passages.

The spiral wound gasket 83 may include at least one of an outer ring and an inner ring in addition to the gasket main body including the hoop 83a and the filler 83b.

Also, features of two or more of the various preferred embodiments described above may be combined.

The present application claims priority to Japanese Patent Application No. 2015-053696 filed on Mar. 17, 2015 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A V-shaped engine comprising:
a V-shaped cylinder body disposed along a V-shaped line defined by a first plane passing through centerlines of a plurality of first cylinders and a second plane passing through centerlines of a plurality of second cylinders;
a first exhaust manifold connected to the plurality of first cylinders and disposed inside of the V-shaped line;
a second exhaust manifold connected to the plurality of second cylinders and disposed inside of the V-shaped line;
an exhaust pipe including a first upstream end portion into which exhaust gases discharged from the plurality of first cylinders to the first exhaust manifold flow, and a second upstream end portion into which exhaust gases discharged from the plurality of second cylinders to the second exhaust manifold flow;
a spiral wound gasket that seals a gap between the first exhaust manifold and the first upstream end portion; and
a first bolt that fastens the first exhaust manifold and the first upstream end portion, the first bolt being located outward of the spiral wound gasket in a radial direction of the spiral wound gasket.

2. The V-shaped engine according to claim 1, further comprising a second bolt that fixes the second upstream end portion to the second exhaust manifold and maintains a constant distance between the second exhaust manifold and the second upstream end portion.

3. The V-shaped engine according to claim 1, wherein the first upstream end portion is separated from the first exhaust manifold along an entire region of the first upstream end portion.

4. The V-shaped engine according to claim 1, further comprising an inner cylinder portion provided in one of the first exhaust manifold and the first upstream end portion; wherein
the spiral wound gasket surrounds the inner cylinder portion.

5. The V-shaped engine according to claim 4, wherein the inner cylinder portion surrounded by the spiral wound gasket is a solid inner cylinder portion that seals an area extending from an inner peripheral surface of the inner cylinder portion to an outer peripheral surface of the inner cylinder portion across an entire circumference of the inner cylinder portion.

6. The V-shaped engine according to claim 1, further comprising:
a spring; wherein
the first bolt fastens the first exhaust manifold and the first upstream end portion via the spring.

7. The V-shaped engine according to claim 1, further comprising a cooling water pipe that guides cooling water between a water passage in the first exhaust manifold and a water passage in the exhaust pipe.

8. The V-shaped engine according to claim 7, wherein the cooling water pipe is disposed around the spiral wound gasket.

9. The V-shaped engine according to claim 7, further comprising an O-ring that seals a gap between an outer peripheral surface of the cooling water pipe and one of the first exhaust manifold and the exhaust pipe.

10. The V-shaped engine according to claim 1, wherein the exhaust pipe further includes a collecting portion that receives a flow of exhaust gases that have flowed into the first upstream end portion and exhaust gases that have flowed into the second upstream end portion.

11. The V-shaped engine according to claim 10, further comprising a catalyst disposed in the collecting portion of the exhaust pipe.

12. The V-shaped engine according to claim 1, wherein the first upstream end portion is separated from the first exhaust manifold in an axial direction of the spiral wound gasket along an entire region outward of the first bolt in the radial direction of the spiral wound gasket.

13. The V-shaped engine according to claim 1, wherein the first upstream end portion is separated from the first exhaust manifold in an axial direction of the spiral wound gasket along both of an entire region inward of the spiral wound gasket in the radial direction of the spiral wound gasket and an entire region outward of the spiral wound gasket in the radial direction of the spiral wound gasket.

* * * * *